INVENTOR
EDWARD A. SIMI
BY
ATTORNEY

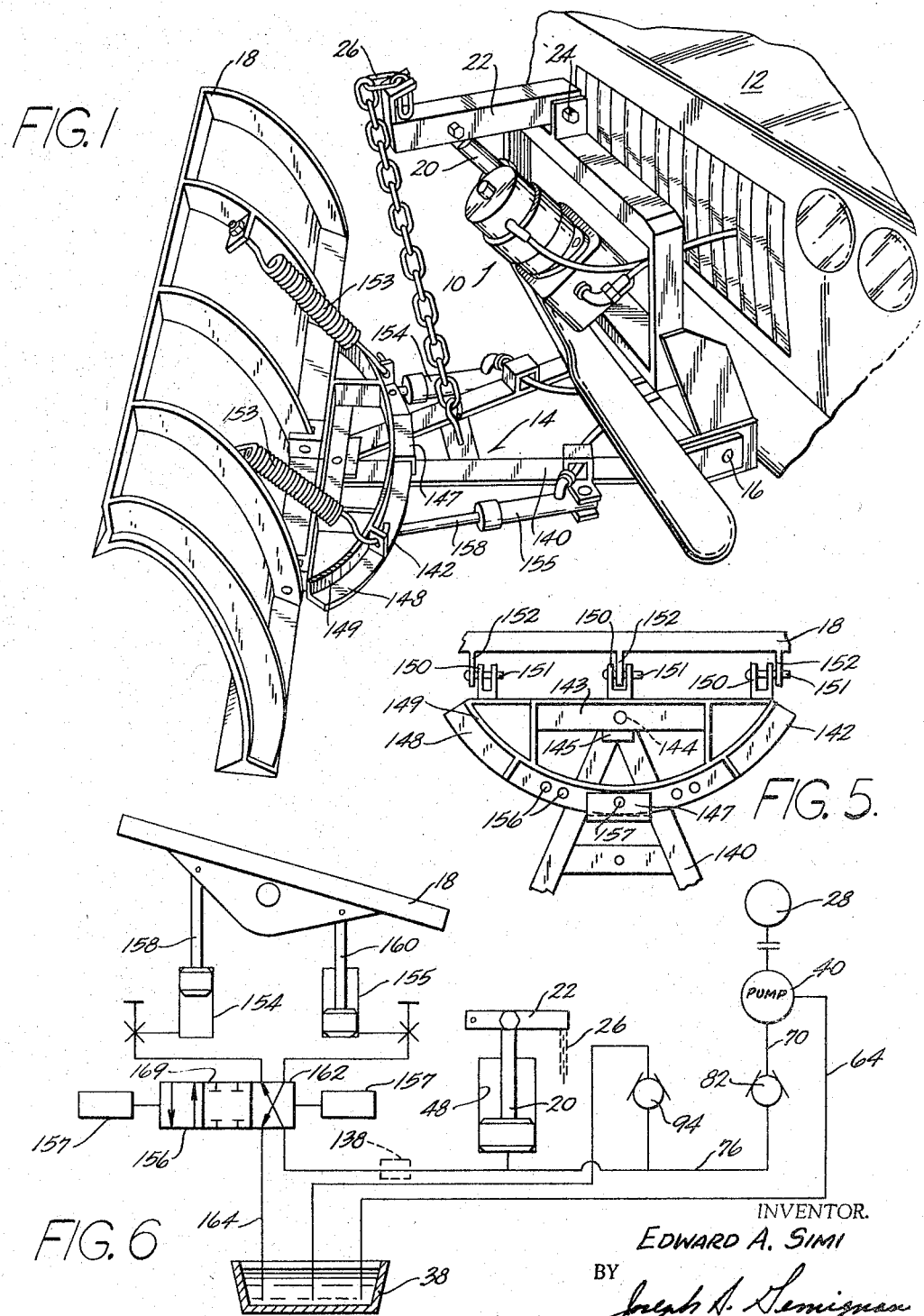

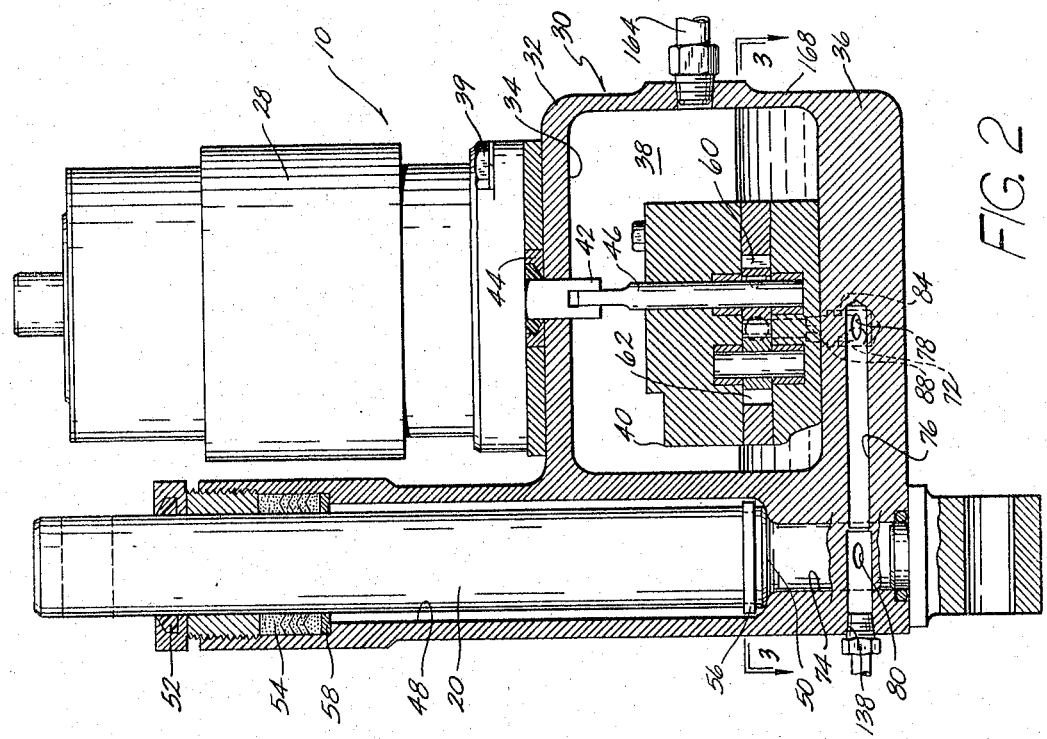
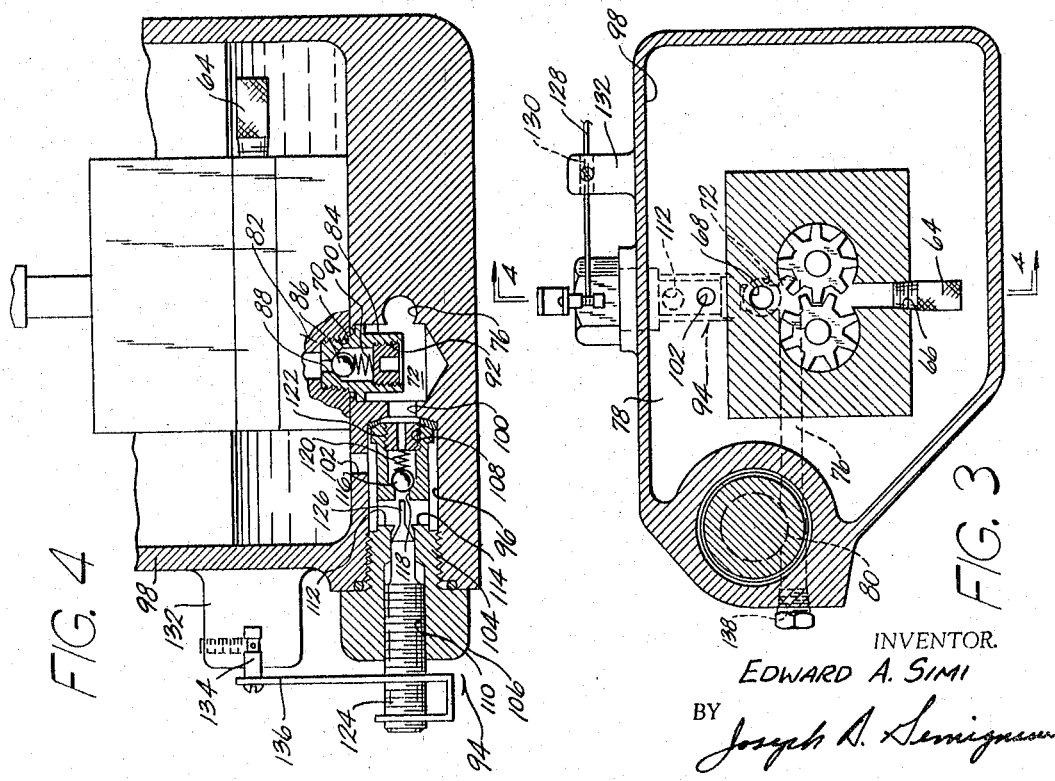

United States Patent Office 3,307,275
Patented Mar. 7, 1967

3,307,275
VEHICLE ACCESSORY UNIT AND POWER
UNIT THEREFOR
Edward A. Simi, Milwaukee, Wis., assignor to Douglas Motors Corporation, Milwaukee, Wis., a corporation of Wisconsin
Filed Aug. 12, 1965, Ser. No. 479,181
17 Claims. (Cl. 37—42)

This invention relates to vehicle accessory units such as snow plows and the like and, more particularly, to hydraulic power units adapted to operate such accessory units.

A general object of this invention is to simplify the construction and improve the operation of a hydraulic power unit.

Another general object of this invention is to provide an improved vehicle accessory unit of this type.

A further object of this invention is to simplify the manufacturing procedures for a hydraulic power unit.

A still further, more specific, object of this invention is to increase the versatility of a hydraulic power unit so that it can be used to affect more than one operation; and, moreover, to do so while maintaining a relatively simplified construction.

In the achievement of these and other objects, this invention proposes a hydraulic power unit which uses a gear pump as the source of power for affecting fluid transfer. The gear pump is preferably positioned in the hydraulic fluid reservoir and provides quiet operation and smooth and positive fluid transfer to affect the primary operational function of the power unit, e.g. a lifting operation, with a relatively simplified fluid channeling arrangement. With this construction, the channeling can be confined within one of the reservoir walls to simplify construction and a relatively simplified valving system can be used to control fluid flow in the system. Furthermore, the hydraulic power unit is provided with an external fluid take-off which can be used to affect a function in addition to the primary power unit function and through virtually the same channeling and with virtually the same valving arrangement as used for the primary function so as to maintain a realtively simplified construction.

Other objects and advantages will be pointed out in, or be apparent from, the specification and claims, as will obvious modifications of the embodiments shown in the drawings, in which:

FIG. 1 is a perspective view of a typical vehicle accessory unit of the type to which this invention relates and incorporating a power unit constructed in accordance with this invention;

FIG. 2 is a partial sectional view of the power unit;

FIG. 3 is a sectional view generally along line 3—3 of FIG. 2;

FIG. 4 is a sectional view generally along line 4—4 of FIG. 3;

FIG. 5 is a top plan view of the connection between the snow plow blade and a support frame attached to the vehicle;

FIG. 6 is a schematic illustration of the primary and optional hydraulic circuits of the power unit;

Figure 7:
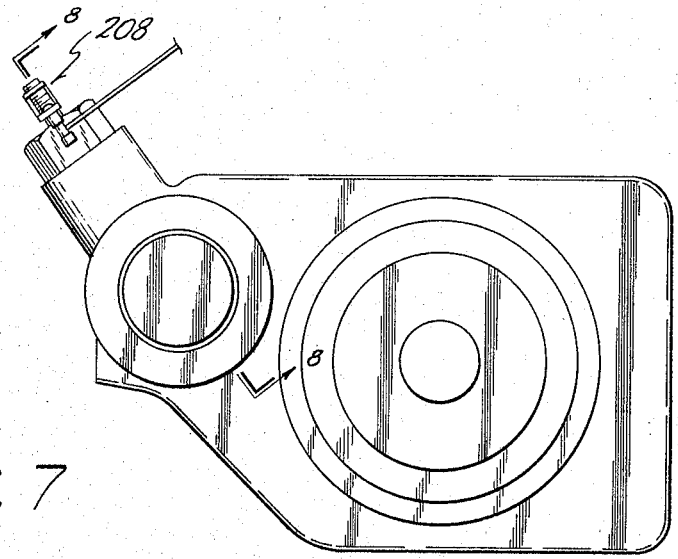
FIG. 7 is a plan view of a portion of a modified form of power unit.

The hydraulic power unit 10 of this invention will find particular application in a vehicle snow plow accessory unit to control raising and lowering of the snow blade and, for that reason, it is illustrated in such an arrangement but it will be appreciated that the power unit has more general utility and is not specifically limited to use with any particular apparatus.

With particular reference to the drawings, lift unit 10 is supported in a frame 11 suitably connected to the front of vehicle 12. Frame 14 is pivotally connected at point 16 to an extension 17 attached to the vehicle frame (not shown) and supports a snow plow blade 18 for vertical and horizontal movement all in a manner to be described more completely hereinafter. Vertical movement of plow blade 18 is achieved by movement of ram 20 which is connected to frame 14 through a lever 22 which is in turn pivotally connected to frame 11 at pivot point 24 and connected to frame 14 by chain 26. From the illustration of FIG. 1 it will be evident that extension of ram 20 raises plow blade 18 whereas the snow plow is lowered when ram 20 retracts into the power unit.

Reference will now be made to FIGS. 2, 3 and 4 for a more specific description of the power unit. Two basic subassemblies, drive motor assembly 28 and hydraulic power assembly 30, make up the power unit. Drive motor assembly 28 can, for example, be a conventional electric motor operated from the vehicle battery, suitably housed to protect it from the elements, and is connected to top wall 34 by cap screws 39. The power unit assembly includes outer housing 32 having a top wall 34 and a bottom wall 36 cooperating with side walls to form an interior hydraulic fluid reservoir 38. Pump 40 is disposed in reservoir 38 and motive power is transmitted to the pump from drive motor assembly 28 through a coupling comprising a first dog shaft 42 extending through suitable seal 44 and top wall 34 into reservoir 38 for connection with a second dog shaft 46 which is connected to the gear pump mechanism in a manner to be described more completely hereinafter.

Ram 20 is supported in an elongated bore 48 for axial movement within the bore. Upward movement of the ram is achieved by delivery of hydraulic fluid from reservoir 38 to the underside or inner axial end 50 of the ram. Suitable gaskets 52 and 54 are provided to achieve a fluid-type seal of the ram in the bore, member 56 is a retaining ring and is mounted on and movable with ram 20 for engagement with steel washer 58, which is part of packing assembly 54 and limits extension of ram 20 to prevent its leaving bore 48.

In accordance with this invention pump 40 is a gear-type pump including gear 60 connected to and rotatable with dog shaft 46 and a second gear 62. Gears 60 and 62 draw fluid from reservoir 28 into the interior of the gear pump through filter assembly 64, connected in inlet 66, and expels the fluid through outlet opening 70. Gear pump 40 is of more or less conventional construction and it will be appreciated that other gear arrangements can be utilized, however, to achieve a simplified channeling for fluid delivery from reservoir 38 to ram 20 and a simplified valve arrangement to control such flow, inlet opening 66 is preferably formed in the pump side wall and hydraulic fluid can flow freely into and out of the pump. Outlet opening 70 is preferably formed in the pump bottom wall to open into bottom wall 36 of the power unit housing.

The gear-type pump provides a quiet operating, compact pumping unit which is also capable of providing continuous, smooth and positive delivery of hydraulic fluid to the ram for most effective operation. Moreover, and in a manner now to be described, the use of this arrangement of a gear-type pump results in a relatively simplified and yet effective channeling and valve arrangement through which fluid is delivered from the reservoir to the ram. More specifically, pump outlet 70 communicates with an outlet chamber 72 which is connected to ram chamber 74 through a single, straight channel 76 extending generally at a tangent to both chambers 72 and 74 and opening thereinto through ports 78 and 80, respectively. Actual communication between pump 40 and outlet chamber 72 is made through check valve assembly 82 which is received in outlet opening 70. The check valve assembly is illustrated in FIG. 4 and structurally it includes a body member 84 threaded into outlet opening 70 and a ball 86 biased toward restricted opening 88 by compression spring 90 which is seated between the ball and a hollow adjusting nut 92 threaded into the interior of body 84. Check valve assembly 82 permits free egress of hydraulic fluid from pump 40 for passage through channel 76 to ram 20 but prevents return flow of hydraulic fluid in the opposite direction so that once pressure has been applied to ram 20 the check valve maintains that pressure on the ram to hold the ram in an extended position. This arrangement of valving and the use of a single delivery channel results in a particularly simplified and compact construction and, moreover, a construction which can be cast and assembled in a relatively simplified manner.

A relief valve assembly 94 is provided to control release of pressure on ram 20 and permit the ram to retract into the bore. As can be seen in FIG. 4, relief valve assembly 94 is received in a chamber 96 provided in bottom wall 36 and opening through one side of the power unit housing. Chamber 96 is connected to outlet chamber 72, and correspondingly channel 76, through port 100 and is connected to reservoir 64 through port 102. Structurally, relief valve assembly 94 includes body portion 104 threaded into chamber 96 having an externally disposed hexhead 106. Body portion 104 also includes a central axial opening having an inner threaded end 108, an outer threaded end 110 and diametrically opposed ports 112 and 114 opening radially from the interior opening to chamber 96. A ball 116 is biased toward engagement with restricted orifice 118 by compression spring 120 which is seated between the ball and a hollow adjusting screw 122 threaded into body end 108. With this arrangement system pressure, the pressure in channel 76 when ram 20 is extended, acts to seat ball 116 to thereby maintain the desired pressure to hold ram 20 in an extended position. When ram 20 is to be lowered, system pressure is released by moving ball 116 from its seat to open a passage from outlet chamber 72, and channel 76, through port 118 and openings 112 and 114, to chamber 96 and from chamber 96 through port 102 to reservoir 38. Ball 116 is moved from its seat by manipulation of quill 124 threaded into end 110 of the interior opening of body 104. End 126 of the quill is positioned at port 118 and when the quill is rotated in body 104 its end 126 is moved axially toward and away from ball 116 to selectively move the ball from its seat or allow the ball to be seated by spring 120.

In operation, when it is desired to extend ram 20 to effect a particular operational function, for example lift snow plow blade 18, motor 28 is energized to drive pump 40 and transfer hydraulic fluid through channel 76 to the ram. When the desired extension of ram 20 has been achieved, drive motor 28 is deenergized and check valve assemblies 82, and 94, prevent return flow of the fluid to the reservoir and maintain the pressure on the ram to hold the ram extension as long as is desired.

When the ram, or the plow blade, is to be lowered, quill 124 is rotated to move ball 116 from its seat. This opens a relief passage from channel 76 through openings 112 and 114 and port 102 to the reservoir thereby relieving the pressure on the underside of ram 20. In the illustrated embodiment the weight of the snow plow blade drives the ram back into its bore and the blade is lowered accordingly. The vertical position of the snow plow blade can be selected at any desired point either during the raising or lowering operation by control of energization of drive motor 28 or by manipulation of quill 124. In the illustrated preferred embodiment rotation of quill 124 is controlled from the vehicle cab by a Bowden wire system. More specifically, Bowden wire 128 extends through a suitable guide 130 seated in boss 132 provided in housing side wall 98 and engages swivel 134 which is in turn connected to a generally U-shaped lever 136. Lever 136 is fixed to quill 124 so that extension and contraction of the Bowden wire, controlled from a vehicle cab (not shown), pivots the lever and rotates quill 124 to either move or permit seating of the valve.

As described to this point power unit 10 is adapted to provide a single operational function, as illustrated to raise and lower a vehicle accessory attachment such as the snow plow blade. Another feature of this invention is the provision of an optional hydraulic take-off port 138. This port is provided in alignment with channel 76 and is positioned downstream of, or on the ram side of, check valve assembly 82. Port 138 opens through the side of the reservoir housing but is closed to the reservoir and can be used in effecting an operational function in addition to the primary lifting function of the power unit. In the preferred embodiment the optional hydraulic fluid take-off is utilized to produce horizontal movement of snow plow blade 18 so that the single power unit 10 is operative to move the snow plow blade both vertically and horizontally. In this connection frame 14 includes an A-frame portion 140 pivotally connected to extension 17 and an arcuate frame portion 142 connected to plow blade 18. Frame portion 142 includes a plate 143 having an opening 144 in registry with a similar opening (not shown) in end 145 of the A-frame. Pivot pin 146 extends through both openings and is suitably anchored to provide a pivot point about which blade 18 can move with respect to the A-frame. Angle bracket 147 is connected to the A-frame and extends over the horizontal leg 148 of angle member 149 of the arcuate frame portion to add further stability to the plow blade. Three clevices 150 are provided as part of the arcuate frame portion and are connected to vertical ribs 152 of the plow blade by pins 151 to permit limited pivotal movement of the plow blade in the event the blade should strike an obstruction such as a rock or the like. Coil springs 153 are connected between the plow blade and the arcuate frame portion to return the blade to its normal position after the obstruction is cleared. Hydraulic cylinders 154 and 155 are connected between frame portion 142 and the A-frame and operation of these hydraulic cylinders is effective to pivot the plow blade horizontally to a desired plowing angle. Hydraulic cylinders 154 and 155 are connected to power unit 10 through optional fluid take-off 138 as will be more completely described hereinafter. During operation the plow blade is free to be pivoted horizontally to a desired plowing angle and this arrangement affords the versatility of permitting a wide selection of plowing angles during use and can be controlled from within the vehicle cab. Leg 148 of member 149 is provided with a number of holes 156 arranged to register with a hole 157 in angle bracket 147 to permit locking the blade in a particular position, if desired, by inserting a pin, bolt or the like (not shown) into the holes.

Reference will now be made to FIG. 6 for a description of the hydraulic control circuit of the basic power unit alone and with an optional circuit controlled through the optional fluid take-off. The basic power unit 10 is illustrated in the right-hand side of FIG. 6 where it can be seen that pump 40 is connected to draw hydraulic fluid from reservoir 38 and deliver the fluid through outlet 70, check valve assembly 82 and channel 76 to bore 48 to raise ram 20. When it is desired to lower ram 20 check valve 94 is opened and establishes a return fluid path from bore 48 to reservoir 38. The optional, or auxiliary, power take-off is made through outlet 138 and manipulation of hydraulic cylinders 154 and 155 is controlled through four-way valve 156. The four-way valve 156 in the preferred embodiment is located under the hood of the vehicle, is operated from within the vehicle cab by manual controls 157 shown schematically in FIG. 6 and is of conventional construction. As illustrated, valve 156 is in a position to deliver hydraulic fluid to cylinder 154 through portion 162 of valve 156 and extend ram 158 to pivot the plow blade clockwise. This movement drives ram 160 into cylinder 155 and valve portion 162 of the four-way valve provides both a path to cylinder 154 to extend ram 158 and also provides a return path to reservoir 38 to permit ram 160 to be retracted into its cylinder. In the preferred embodiment the return path from the four-way valve to the reservoir is provided through coupling 164 in side wall 168 of the power unit housing. The center section 169 of the four-way valve is a closed center so that when the valve is in that position there is no flow to either hydraulic cylinder 154 or 155 and in this position only the basic power unit circuit is utilized. End section 156 is effective to deliver hydraulic fluid to cylinder 155 while providing a return path from cylinder 154 to permit rotation of the plow blade in an opposite direction or counter-clockwise.

Figure 8:
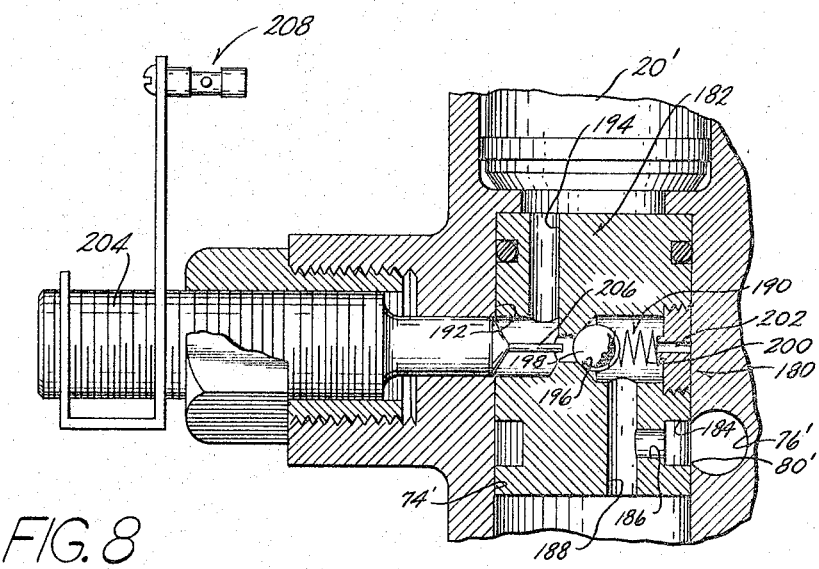
FIG. 8 is an enlarged sectional view generally along line 8—8 of FIG. 7.

In the operation of the power unit and hydraulic unit described to this point, continuous pressure from the gear pump is maintained on the ram throughout operation of the optional fluid take-off (the blade turning mechanism) in addition to during the lifting operation of the blade. In general operation, this is not objectionable since the pressure necessary to elevate the blade is greater than that required to operate the turning mechanism to pivot the blade. With the blade in its down position the optional fluid take-off can be used without causing any vertical blade movement. Although with the blade raised operation of the optional fluid take-off would affect the blade position, any variation in blade position could be readily corrected at the completion of the operation of the optional fluid take-off. Accordingly even though the gear pump must maintain continuous pressure on the ram, the blade, or whatever element is controlled by the optional take-off, can be turned with little if any effect on the vertical position of the blade. It is recognized that in some applications it may be desirable to isolate the ram from the blade turning mechanism during operation of the latter to thereby increase the versatility of the overall system. In FIGS. 7 and 8 a modification is illustrated which is effective to achieve this selective isolation of the ram and blade turning mechanism. More particularly, a plug valve insert 180 is positioned within ram chamber 74' and is effective to control flow of hydraulic fluid from passage 76' to the underside of ram 20' to lift the blade. The outer wall of the body 182 of the plug valve includes a circumferentially extending relief portion 184 which, when the plug valve is inserted in chamber 74', is disposed in alignment with port 80' through which hydraulic fluid passes from channel 76' to chamber 74'. By a system of internal channeling hydraulic fluid is directed through body 182 to the underside of ram 20'. More particularly, a channel 186 extends between relief portion 184 and an inner axially directed channel 188. Axial channel 188 extends to a ball check assembly 190 and through the ball check assembly communicates with channel 192 and a second axially directed channel 194 which opens to the underside of ram 20'. Valve seat 196 is provided in channel 192 for recepit of ball 198, the latter being biased toward the seat by a compression spring 200 which is seated between the ball and an adjustable hollow set screw 202. Quill 204, similar in construction to quill 124, is received in channel 192 and has its end 206 disposed adjacent ball 198. The quill is controlled by a Bowden wire system 208 which can be identical to that used to control quill 124 and extends into the vehicle control cab. Rotation of the quill is effective to move ball 198 from its seat or to release the ball to be seated under the influence of spring 200. This construction provides a two position, selectively operable valve between ram 20' and the gear pump to selectively connect the ram to the gear pump to lift the blade or to isolate the ram from the pump to permit independent operation of the turning mechanism while maintaining pressure on the ram to hold the blade in a desired elevated position. It will be appreciated that the remainder of the power unit is identical to that already discussed, for example the power unit retains the check valve assembly 82 and the relief valve assembly 94. For convenience only the elements of the two position valve have been illustrated in FIGS. 7 and 8.

With this construction and assuming the use of a closed center control valve to control the turning mechanism, i.e. the closed center four-way valve disclosed in FIG. 6, the blade can be lifted or turned with the mechanisms for affecting both of these operations isolated from each other as desired. In operation, where it is desired merely to lift the snow plow blade the closed center valve can be adjusted to its closed center thereby isolating the turning mechanism from the fluid line and quill 204 is manipulated to open ball check assembly 190. Hydraulic fluid pumped through passage 76' is then delivered to the underside of ram 20' to raise the plow blade. At any desired vertical elevation the blade can be stopped and held in that position by allowing ball check valve 190 to close and then the blade can be turned to any desired horizontal position without affecting the vertical position of the blade since ball check valve 190 isolates the underside of ram 20' from the remainder of the hydraulic system to thereby maintain ram pressure. It will be appreciated that the two position valve illustrated and described is merely given as an example of one of many types of valves which could be used to provide this selective control.

The power unit of this invention is compact and readily manufactured and assembled. The gear pump is disposed in the reservoir and draws fluid directly from the reservoir and transfers that fluid to the lift cylinder through a single channel which considerably simplifies the housing structure and the coring required to cast the housing for the power unit. Also, in the basic power unit, delivery of hydraulic fluid, maintenance of hydraulic pressure on the ram to hold it in a desired operated position and release of the ram is achieved with only two valve assemblies, but while still affording effective selective control over the power unit thereby achieving further simplification of the power unit without sacrificing operational effectiveness. Moreover, the power unit of this invention, with this arrangement of fluid passages and control valves, is readily adapted to provide the optional fluid take-off without complicating either the structure of the power unit or the manufacturing of the power unit, specifically the coring required for casting the power unit housing. With the optional fluid take-off, the power unit can control more than one operation as is illustrated in the preferred embodiment wherein the power unit can be used to manipulate a snow plow blade both vertically and horizontally. Even in the modified form of FIGS. 7 and 8 the same basic fluid channeling and valve arrangements are used with the added versatility being achieved merely through the insertion of a two position valve in the basic channeling.

I claim:

1. A hydraulic operating system comprising, in combination, an operative member,
   means for supporting said operative member for vertical movement,
   an integral power unit including a hydraulic ram,
   means connecting said ram to said member, to raise said member,
   means defining a reservoir for hydraulic fluid within said power unit,
   gear pump means in said power unit,
   means in said power unit connecting said gear pump means to said reservoir for free flow of hydraulic fluid between said gear pump means and said reservoir,
   said power unit also including motor means connected to and driving said gear pump means,
   means defining a channel within said power unit extending from said gear pump means to said ram for delivery of hydraulic fluid to said ram to raise said ram and correspondingly raise said member,
   check valve means in said channel operatively interposed between said gear pump means and said ram and operative to pass hydraulic fluid from said gear pump means to said ram and to check flow from said ram to said gear pump means to maintain hydraulic pressure on said ram,
   and relief valve means in said power unit operatively interposed between said channel and said reservoir and disposed on the ram side of said check valve means and operative selectively to connect said channel with said reservoir to relieve the hydraulic pressure on said ram and release said member for downward movement.

2. A vehicle accessory system comprising, in combination, an operative member,
   means for connecting said operative member to said vehicle for vertical movement and for additional movement independent of said vertical movement,
   an integral power unit including a ram connected to said member,
   means supporting said ram for vertical movement to move said member vertically,
   means in said power unit defining a reservoir for hydraulic fluid,
   pump means in said power unit and communicating with said reservoir,
   means defining a channel within said power unit extending between said pump and said ram through which hydraulic fluid is delivered to said ram to apply hydraulic pressure to and raise said ram,
   means connected to said operative member and effective when energized to move said operative member independently of said ram and in addition to said vertical movement,
   means defining a hydraulic fluid take-off in said power unit and in communication with said channel,
   and means connecting said hydraulic fluid take-off to said means for moving said operative member independently of said ram so that said power unit can effect both movements of said operative member.

3. The vehicle accessory system of claim 2 including valve means integral with said power unit and operatively disposed between said ram and said pump means and between said ram and said hydraulic fluid take-off and operable selectively to open said ram to fluid flow from said pump means and to close said ram to fluid flow from said pump means and thereby isolate said ram from said fluid flow so that said hydraulic fluid can be pumped to said means for moving said operative member independently of said ram without affecting said ram.

4. The vehicle accessory system of claim 2 including check valve means operatively interposed between said pump means and said ram and operative to pass hydraulic flow from said pump means to said ram and to check flow from said ram to said pump means,
   and wherein said hydraulic fluid take-off is disposed on the ram side of said check valve means.

5. The vehicle accessory system of claim 4 including relief valve means operatively interposed between said channel and said reservoir and disposed on the ram side of said check valve means and operative selectively to connect said channel with said reservoir for relief of the hydraulic pressure on said ram to permit said operative member to move downwardly.

6. A vehicle accessory system comprising, in combination,
   a plow blade,
   means supporting said plow blade for vertical and horizontal movement,
   a ram,
   means connecting said ram to said plow blade for affecting vertical movement of said plow blade,
   an integral power unit including means defining a reservoir for hydraulic fluid within said power unit and also including pump means in said power unit,
   means defining a channel in said power unit extending between said pump means and said ram to deliver hydraulic fluid to and raise said ram to raise said plow blade,
   motor means integral with said power unit and connected to and operative to drive said pump means,
   check valve means in said channel operatively interposed between said pump means and said ram and operative to pass hydraulic fluid from said pump means to said ram and to check flow from said ram to said pump means,
   relief valve means in said power unit operatively interposed between said channel and said reservoir and disposed on the ram side of said check valve means and operative selectively to connect said channel with said reservoir for release of the hydraulic pressure on said ram to permit the plow blade to lower,
   means defining a hydraulic fluid take-off in said power unit and communicating with said channel,
   means connected to said plow blade and operative when energized to move said plow blade horizontally,
   and means connecting said hydraulic fluid take-off to said last-mentioned means for transfer of hydraulic fluid to said last-mentioned means for energization thereof to effect said horizontal movement.

7. The vehicle accessory system of claim 6 including valve means in said power unit operatively disposed between said ram and said pump means and between said ram and said hydraulic fluid take-off and operable selectively to open said ram to fluid flow from said pump means and to close said ram to fluid flow from said pump means and thereby isolate said ram from said fluid flow so that said hydraulic fluid can be pumped to said means for moving said plow blade without affecting said ram.

8. The combination of claim 6 wherein said power unit includes a housing with said reservoir being defined in said housing,
   said pump means comprising gear pump means disposed in said reservoir and including means defining an inlet from said gear pump means to said reservoir for free flow of hydraulic fluid to said gear pump means to and from said reservoir and also including means defining an outlet from said gear pump means to said channel,
   said ram, channel and valve means being provided in said housing and said motor means being attached to and integral with said housing.

9. The combination of claim 8 wherein said means connecting said hydraulic fluid take-off to said means for moving said blade horizontally includes multiple position valve means having first and second operative positions and is effective in said first and second positions to direct hydraulic fluid to move said plow blade in opposite horizontal directions.

10. The combination of claim 9 wherein said multiple position valve means has a third position closing said horizontal moving means to fluid flow.

11. An integral hydraulic power unit including
a housing,
a ram,
means defining a reservoir for hydraulic fluid in said housing,
gear pump means in said housing,
means in said housing connecting said gear pump means to said reservoir for free flow of hydraulic fluid between said gear pump means and said reservoir,
means defining an outlet from said gear pump means,
means defining a channel in said housing extending from said outlet to said ram,
check valve means in said housing operatively positioned between said gear pump means and said ram and operative to pass hydraulic flow from said pump means to said ram and to check flow from said ram to said pump means,
and relief valve means operatively interposed between said channel and said reservoir and disposed on the ram side of said check valve means and operative selectively to connect said channel with said reservoir for relief of the hydraulic pressure on said ram.

12. An integral hydraulic power unit assembly including
a housing including a reservoir,
a gear pump attached to a wall in said housing which cooperates in defining said reservoir, said gear pump disposed in said reservoir and having an inlet open to said reservoir for free flow of hydraulic fluid to said gear pump to and from said reservoir and an outlet opening at said housing wall,
a ram disposed in a bore in said housing and supported for axial movement in said bore,
means defining a channel in said housing wall and extending between said pump outlet and said housing bore,
check valve means operatively interposed in said channel between said pump outlet and said bore and operative to pass hydraulic flow from said pump to said bore and to check flow from said bore to said pump,
and relief valve means in said housing and having a control portion extending exteriorly of said housing, said relief valve means communicating with said channel on the bore side of said check valve means, said relief valve means operatively interposed between said channel and said reservoir and selectively operable to open said channel to said reservoir to relieve the hydraulic pressure on said ram.

13. A hydraulic operating system comprising, in combination,
an operative member,
means supporting said operative member for movement in two different planes of movement,
an integral power unit including a ram connected to said operative member,
a chamber in said power unit communicating with said ram,
means defining a reservoir for hydraulic fluid in said power unit,
pump means in said power unit and communicating with said reservoir,
means defining a channel in said power unit extending between said pump means and said chamber through which said pump means directs hydraulic fluid for operation of said operative member,
check valve means in said power unit and operatively interposed between said pump means and said chamber and operative to pass hydraulic fluid from said pump means to said chamber and to check flow from said chamber to said pump means,
relief valve means operatively interposed between said chamber and said reservoir and disposed on the chamber side of said check valve means and operative selectively to connect said chamber to said reservoir for release of hydraulic pressure on said ram,
means defining a hydraulic fluid take-off in said power unit and in communication with said channel,
operating means connected to said operative member and said hydraulic fluid take-off and operative when energized to move said operative member independently of movement of said operative member by said ram,
and valve means having two positions and disposed in said chamber and operative selectively to connect said ram for communication with said channel for operation of said ram and to isolate said ram from said channel for operation of said operating means to move said operative member independently of said ram.

14. The hydraulic operating system of claim 13 including valve means operatively interposed between said hydraulic fluid take-off and said operating means and operative to interrupt the flow of hydraulic fluid to said operating means to permit operation of said ram independently of said second operating means.

15. The combination of
a vehicle,
a plow blade,
means supporting said plow blade from the front of said vehicle for vertical and horizontal movement with respect to said vehicle front,
an integral power unit mounted exteriorly on the front of said vehicle and including first ram means connected to said plow blade, a reservoir for hydraulic fluid, gear pump means, means within said unit defining passages connecting said first ram means, gear pump means and reservoir, said gear pump means providing fluid pressure in said passages for producing flow of hydraulic fluid between said first ram means and reservoir, a hydraulic fluid take-off in said power unit and in communication with said passages and the fluid pressure therein, and motor means connected to and operative to drive said gear pump means,
second ram means connected to said plow blade for moving said plow blade horizontally,
passage means communicating with said take-off and the fluid pressure of said gear pump means and connected to said second ram means to deliver fluid to operate said second ram means and move said plow blade horizontally,
and valve means controlling and directing fluid flow to said first and second ram means.

16. The combination of claim 15 wherein said second ram means comprises first and second rams each operative selectively to move said plow blade in opposite horizontal directions,
and said valve means includes an operable portion having at least two operable positions for directing hydraulic fluid selectively to said first and second rams.

17. A vehicle accessory system comprising, in combination,
a plow blade,
means supporting said plow blade for vertical and horizontal movement,
a ram,
means connecting said ram to said plow blade for affecting vertical movement of said plow blade,
an integral power unit including means defining a reservoir for hydraulic fluid within said power unit,
pump means in said power unit, means defining a channel in said power unit extending between said pump means and said ram to deliver hydraulic fluid to and raise said ram to raise said plow blade, said power unit including motor means connected to and operative to drive said pump means, means defining a hydraulic fluid take-off in said power unit and communicating with said channel, means connected to said plow blade and operative when energized to move said plow blade horizontally, means connecting said hydraulic fluid take-off to said last-mentioned means for transfer of hydraulic fluid to said last-mentioned means for energization thereof to effect said horizontal movement, and valve means integral with said power unit and operative to isolate said ram from said fluid flow for operation of said means for moving said plow blade independently of and without affecting said ram.

References Cited by the Examiner

UNITED STATES PATENTS

| | | | |
|---|---|---|---|
| 1,993,612 | 3/1935 | Lum | 60—52 |
| 2,056,954 | 10/1936 | Bryant | 60—52 |
| 2,210,144 | 8/1940 | Day | 60—52 |
| 2,532,552 | 12/1950 | Jirsa et al. | 60—52 |
| 3,201,878 | 8/1965 | Markwardt | 37—42 |

EDGAR W. GEOGHEGAN, *Primary Examiner.*